L. KELLOGG.
PHOTOMETER CHART.
APPLICATION FILED JUNE 9, 1919.

1,419,385.

Patented June 13, 1922.
2 SHEETS—SHEET 1.

Witnesses:
C. E. Wessels.

Inventor:
Leroy Kellogg,
By Joshua R. H. Potts
Attorney.

L. KELLOGG.
PHOTOMETER CHART.
APPLICATION FILED JUNE 9, 1919.

1,419,385.

Patented June 13, 1922.
2 SHEETS—SHEET 2.

Witnesses:
C. E. Wessels.

Inventor:
Leroy Kellogg,
By Joshua R. H. Potts
Attorney.

UNITED STATES PATENT OFFICE.

LEROY KELLOGG, OF CHICAGO, ILLINOIS.

PHOTOMETER CHART.

1,419,385. Specification of Letters Patent. Patented June 13, 1922.

Application filed June 9, 1919. Serial No. 302,711.

*To all whom it may concern:*

Be it known that I, LEROY KELLOGG, a citizen of the United States, and a resident of the city of Chicago, county of Cook, and State of Illinois, have invented certain new and useful Improvements in Photometer Charts, of which the following is a specification.

My invention relates to a photometer chart and has for its object the provision of a simple and inexpensive device by which the necessary time of exposures for the production of clear and sharp negatives may be accurately and quickly determined. Another object is the production of a device by which the various shades of prints may be determined during the printing process.

Other objects will appear hereinafter.

The invention consists in the combinations and arrangements of parts hereinafter described and claimed.

Figure 1:
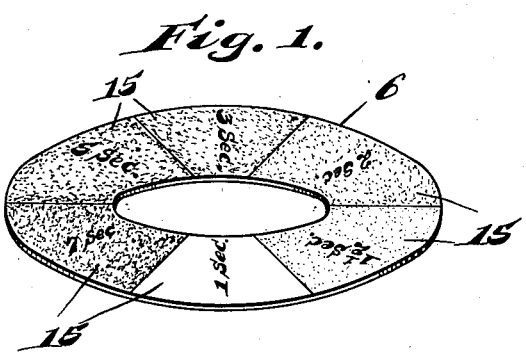
Figure 2:
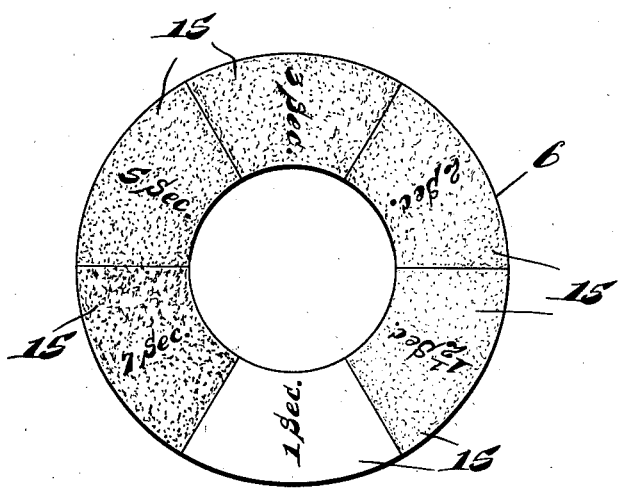
Figure 3:
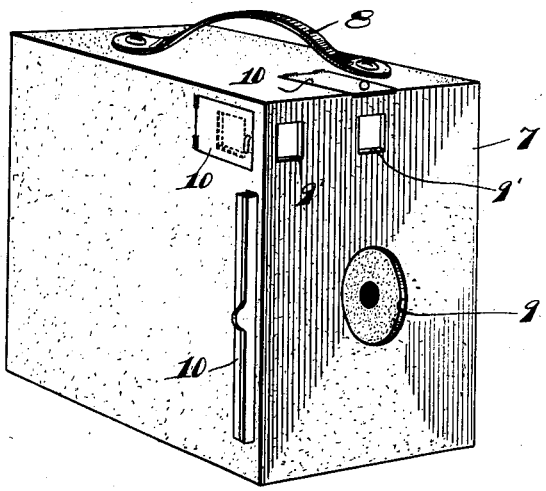
Figure 4:
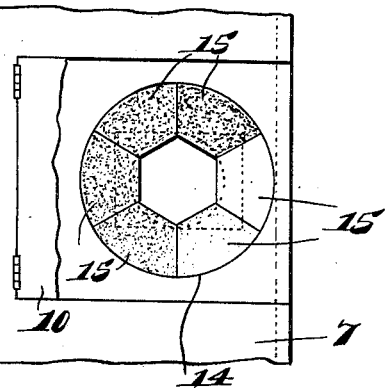
Figure 5:
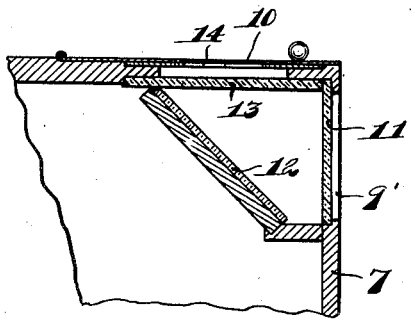

The invention will be best understood by reference to the accompanying drawings forming a part of this specification, and in which, Fig. 1, is a perspective view of my invention, Fig. 2, is a top plan view of my invention, Fig. 3 is a perspective view of a camera embodying the invention, Fig. 4 is a fragmentary top plan view showing the invention applied to a camera, and Fig. 5 is a fragmentary sectional view of the invention applied to a camera.

In making photographic exposures, it is necessary to time the exposure in accordance with the shadows which surround and which are upon the object which is to be photographed, irrespective of the bright lights in the field of view. A photographic negative is not considered to be technically perfect unless there is detail in that part of the photographed object which bears the deepest shadows. Consequently, in order to get a technically perfect photographic negative, it is necessary that the sensitive film or plate be exposed a sufficient length of time to permit that part of the object upon which the darkest shadows appear, to stand out clear and distinct upon the photographic negative. It, therefore, is evident that the light which proceeds from the shadowed portion of the object to be photographed becomes the criterion of the necessary time for exposure, and that the light from the whiter or brighter part of the object to be photographed is not considered in determining the necessary time of exposure.

It is also apparent, consequently, that the brightness or dullness of the day upon which the photograph is to be taken, is not a determining factor, but that the light which proceeds from the object itself becomes the determining factor. In photographing different objects under the same light conditions, the length of time necessary for exposure will always be the same, but the light often varies on account of reflections from other objects and the casting of shadows upon the photographed object.

To determine the depth of the deepest shadow upon the object to be photographed, I provide a chart 6, the preferable form of which is a circular disc divided into sectors 15. The different sectors being colored differently, beginning with a white sector and passing through the various graduated tones to a dark brown or deep gray. These differently shaded sectors correspond to the shades which are customarily found upon objects to be photographed and the necessary time of exposure of a photographic plate to bring out clearly and distinctly the details of the shadowed portion of the object are predetermined and the necessary time of exposure is preferably printed upon the shaded segment or portion.

In the use of the colored chart, with its graduated tones printed or painted thereon, the chart is placed adjacent the shadow which is cast on the ground glass of the camera. In taking photographs, the operator firsts adjusts his camera with his head enclosed in a black hood, and the image of the object to be photographed is cast upon the ground glass at the rear of the camera. Various methods have been devised for determining the depth of the shadow cast on this ground glass, in order to determine the necessary time of exposure to bring out a clear and distinct photographic negative. In the application of my device, the chart upon which the various graduated tones appear, is independent of the camera, and is placed adjacent the ground glass, where the deepest shadow appears, and that portion of the disc which corresponds to the deepest shadow is found by direct comparison with the various colored portions of the chart to the shadow appearing on the ground glass. The chart having printed on the different colored portions the time necessary for exposure, it becomes readily apparent that the determination of the necessary time of exposure to produce a clear and distinct negative is quickly arrived at and rendered a very simple operation.

This device may also be used with a camera in which an object-finder is used. In this case the camera 7, which is provided with the usual handle 8, and the usual shutter 9, is equipped with the usual type of object-finder 9'. I have shown an object-finder equipped with a cover 10 which serves to shield the object-finder and its co-operating colored chart 6, when not in use, but this cover 10 may be dispensed with, inasmuch as the chart 6, which is used in conjunction with the object-finder, is preferably constructed of celluloid or some other material which is not subject to deterioration or damage by climatic conditions. The object-finder is equipped with the usual ground glass 11 and the inclined mirror 12, and the ground glass plate 13, as will be readily understood. Mounted adjacent the glass 13, in any suitable manner, is a disc 14, having a central aperture through which observation of a shadow may be made and which is divided into sectors, the different sectors being colored, beginning with a white sector and passing through various graduated tones to a deep dark gray, these various colors corresponding to the color of the various shadows which are generally encountered in photographic work. The disc is so colored that it will be possible to match the various tones which the objects may present in the object-finder, very closely, at least, with one of the tones appearing on the colored chart. These differently colored sectors are also marked so as to indicate the necessary time of exposure when an object presents shadows corresponding to any of these colors.

Although I have shown the device in the form of a disc, divided into different colored sectors, it may be equally well applied in the form of an elongated strip, in which case, when applied to a camera in conjunction with an object-finder, it would be slidably mounted in a slot provided on the camera.

I am aware that various devices have been used for the purpose of ascertaining the depth of a shadow and thereby determining the necessary time of exposure to produce a clear and distinct negative, but the device which I have invented is used, primarily, for the direct comparison of the shadow with the chart, that is, the chart is placed alongside of the shadow so that when the corresponding color of the chart is adjacent the shadow, the two blend into one. Where the shadow is cast upon a ground glass plate, the chart is placed flatly against the plate, thereby affording an accurate and quick method of determining the depth of the shadow. In the various devices with which I am acquainted, which have been used for the purpose of ascertaining the depth of a shadow, a considerable distance separates the meter device from the shadow chart, with a consequent result of inaccuracy and less perfect work.

Another beneficial use to which the chart which I have invented may be applied, is in determining the depth of the coloring of a print in photographic printing work. When the chart is designed to be used for this purpose, the various sectors would be colored in the various shades of brown or other colors which the print may assume. In order to determine when the print is developed sufficiently, that color of the chart corresponding to the color desired in the print would be placed in close juxtaposition to the deepest shadow appearing on the print. By this method a print may be developed until a predetermined depth of shadow is arrived at with a consequent result of more uniform printing in the various prints and also with a consequent saving of print paper, owing to the fact that there is little danger of overdeveloping the print when this method is used.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In combination with a camera object finder having a ground glass; a chart divided into a number of sectors, each of said sectors bearing graduated colors and a central aperture formed in said chart affording means for direct comparison of said graduated colors with a shadow of an object present in the said object finder, substantially as described.

2. In combination with a camera object finder having a ground glass; a chart positioned above said ground glass, said chart divided into a plurality of sectors bearing graduated colors affording means for direct comparison with a shadow of an object present in said object finder; a central aperture formed in said chart through which the shadow present in said object finder may be observed; and representations of seconds displayed on each of said sectors for predetermining the time of exposure, substantially as described.

In testimony whereof I have signed my name to this specification in the presence of two subscribing witnesses.

LEROY KELLOGG.

Witnesses:
    JOSHUA R. H. POTTS,
    HELEN F. LILLIS.